(12) United States Patent
Bitzer

(10) Patent No.: US 6,245,408 B1
(45) Date of Patent: Jun. 12, 2001

(54) HONEYCOMB CORE WITH CONTROLLED CRUSH PROPERTIES

(75) Inventor: Thomas N. Bitzer, Danville, CA (US)

(73) Assignee: Hexcel Corporation, Dublin, CA (US)

( * ) Notice: Subject to any disclaimer, the term of this patent is extended or adjusted under 35 U.S.C. 154(b) by 0 days.

(21) Appl. No.: 09/314,600

(22) Filed: May 19, 1999

(51) Int. Cl.$^7$ .................................................. B32B 3/12
(52) U.S. Cl. .............................................................. 428/118
(58) Field of Search ................................ 428/593, 116, 428/118

(56) References Cited

U.S. PATENT DOCUMENTS

| | | | |
|---|---|---|---|
| 3,226,902 | 1/1966 | Elmendorf | 52/615 |
| 3,529,693 | 9/1970 | Woodward et al. | |
| 3,552,086 | 1/1971 | Allen | 52/618 |
| 3,687,223 | 8/1972 | Streck | 181/33 |
| 3,700,067 | 10/1972 | Dobbs et al. | 181/33 |
| 3,753,843 | 8/1973 | Hutchison | 161/43 |
| 4,045,267 | 8/1977 | Davis et al. | 156/197 |
| 4,091,160 | 5/1978 | Koss | 428/245 |
| 4,093,482 | 6/1978 | Ogata et al. | 156/210 |
| 4,111,081 | 9/1978 | Hilliard et al. | 181/290 |
| 4,249,974 | 2/1981 | Wilson | 156/85 |
| 4,269,882 | 5/1981 | Carrillo et al. | 428/116 |
| 4,298,090 | 11/1981 | Chapman | 181/286 |
| 4,384,634 | 5/1983 | Shuttleworth et al. | 181/213 |
| 4,479,992 | 10/1984 | Häeseker et al. | 428/116 |
| 4,849,276 | 7/1989 | Bendig et al. | 428/117 |
| 5,255,483 | 10/1993 | Agrawal et al. | 52/397 |
| 5,264,270 | 11/1993 | Agrawal | 428/192 |
| 5,445,861 | 8/1995 | Newton et al. | 428/116 |
| 5,579,699 | 12/1996 | Dannawi et al. | 105/416 |
| 5,620,276 | * 4/1997 | Niemerski et al. | 428/116 X |
| 5,649,721 | 7/1997 | Stafford et al. | 280/751 |
| 5,670,000 | 9/1997 | Colson et al. | 156/197 |
| 5,804,030 | * 9/1998 | Jaegers et al. | 156/510 |

FOREIGN PATENT DOCUMENTS

| | | |
|---|---|---|
| 01119574 | 5/1989 | (EP) . |
| 2 691 124 | 5/1992 | (FR) . |
| 2323 146 | 9/1998 | (GB) . |
| 97/10098 | * 3/1997 | (WO) . |
| WO 98/06553 | 2/1998 | (WO) . |

* cited by examiner

Primary Examiner—Francis J. Lorin
(74) Attorney, Agent, or Firm—W. Mark Bielawski; David J. Oldenkamp

(57) ABSTRACT

The crush properties of honeycomb are modified and controlled by providing crush control surfaces at the intersections of the honeycomb cell wall. The crush control surfaces form openings through the cell walls at the intersections which provide a reduction in crush strength of the honeycomb cell. A wide variety of crush properties for a given honeycomb may be accurately achieved by varying the size, shape, number and location of the crush control surfaces within the honeycomb.

18 Claims, 3 Drawing Sheets

HONEYCOMB CORE WITH CONTROLLED CRUSH PROPERTIES

BACKGROUND OF THE INVENTION

1. Field of the Invention

The present invention relates generally to honeycomb cores which are designed to absorb energy by deforming on impact. Energy absorbing honeycomb cores are used in a wide variety of applications including crash pads which are placed at various locations within a vehicle to reduce injuries caused when occupants hit interior surfaces of the vehicle during a crash. More particularly, the present invention relates to methods for controlling the crush properties of such honeycomb.

2. Description of Related Art

There has been and continues to be major effort to develop and design vehicle interiors which protect occupants as much as possible during the extreme forces experienced during crashes. One approach has involved the placement of crash or crush pads at various locations within the vehicle interior. The crash pads are designed to absorb the energy of impact as the occupant contacts the vehicle interior during a crash.

Initial crash pads were made from elastomeric materials, such as rubber, or from foamed plastics. Although these materials provide some protection, they are not particularly efficient and they may release stored energy during impact. This release of stored energy, commonly referred to as "rebound," can actually exacerbate injuries suffered during a crash. In addition, foam products suitable for use as crash pads tend to be bulky. As a result, they are not well-suited for use in vehicle interiors where space is limited. In order to reduce the bulk of foamed plastics, they must be made to high densities. However, such high density foams tend to be difficult to manufacture.

Honeycomb structures have been used in crash pads as an alternative to elastomers and foams. Honeycomb structures are advantageous because they are capable of efficiently absorbing large amounts of energy. One example of a honeycomb-based crash pad is disclosed in U.S. Pat. No. 5,649,721. The crash pad is designed for aircraft interiors and utilizes an aluminum honeycomb as the basic energy absorbing material.

In addition to crash pads used on the interior of vehicles, honeycomb has been used as the principal energy absorbing element in a wide variety of other applications. For example, crash cushions employing honeycomb cores have been mounted to the rear of highway maintenance vehicles to provide impact protection. Also, honeycomb crash cushions may be employed as barriers around highway structures or in any other situation where absorption of impact energy is desired.

The crush properties of the honeycomb are important characteristics which must be taken into consideration when designing a crash pad or crash cushion. The materials used to make the honeycomb, as well as the honeycomb shape and wall thickness, may be varied considerably to achieve different types and degrees of crush properties. However, in many situations, it is desirable to fine tune or otherwise control crush properties to achieve specific crush characteristics for the honeycomb. Such fine tuning and control of the crush properties may be difficult or even impossible to achieve by varying material types and/or honeycomb cell shape and wall thickness.

SUMMARY OF THE INVENTION

In accordance with the present invention, it was discovered that the crush properties of honeycomb could be carefully controlled by providing compression control surfaces located at positions in the honeycomb where the cell walls intersect. The compression control surfaces define openings in the honeycomb cells at the cell wall intersections. The compression control surfaces provide a way to fine tune or otherwise control the crush properties of honeycomb to achieve a wide variety of specific crush characteristics.

The present invention may be used to modify and control the crush properties of a wide variety of honeycomb. In general, the overall honeycomb will have a length, a width and a thickness. The basic honeycomb will include a plurality of cell walls which are connected together at a plurality of intersections which extend in the thickness direction of the honeycomb to form a plurality of cells. In accordance with the present invention, compression control surfaces are located in at least one of the intersections to reduce the crush strength of the honeycomb.

The crush properties of the honeycomb may be fine tuned by varying the location, number and size of the compression control surfaces located within the honeycomb. In addition, the shape of the compression control surfaces may be varied to achieve desired crush properties. The compression control surfaces may be distributed uniformly throughout the honeycomb or they may be concentrated in certain areas to achieve varying crush properties within the same honeycomb structure. Further, the size of the compression control surfaces may also be varied within a single honeycomb in order to fine tune and control crush properties.

The present invention is applicable to a wide variety of honeycomb structures and may be used as a simple and efficient procedure for achieving an almost unlimited number of specific crush parameters for honeycomb. Crush strength is a primary crush property which may be controlled using the present invention. Deformation of the honeycomb during crushing is another important property which may also be controlled using compression control surfaces.

The above-discussed and many other features and attendant advantages of the present invention will become better understood by reference to the following detailed description when taken in conjunction with the accompanying drawings.

DETAILED DESCRIPTION OF THE INVENTION

The present invention involves placing holes at specific locations within a honeycomb in order to modify and control the crush properties of the honeycomb. The holes form compression control surfaces in the honeycomb walls at the point wherein the honeycomb walls intersect each other. It was discovered that placing holes at the cell wall intersection is an efficient way to fine tune and control the crush properties of a given honeycomb. The holes which are formed in the honeycomb constitute openings through the cell walls at the intersections. The cell wall surfaces at these openings are referred to herein as compression control surfaces.

The present invention may be used to modify the crush properties of a wide variety of honeycomb types. Exemplary honeycombs include those used as crash pads which are located inside vehicles at various locations to absorb energy during a crash. Other exemplary honeycombs include those used in crash cushions on vehicle exteriors or to protect other stationary or mobile structures from collisions. Any number of energy-absorbing materials may be used to make such honeycombs. Aluminum and aluminum alloys are preferred energy-absorbing materials. For example, see U.S. Pat. No. 5,649,721 which discloses the use of aluminum honeycomb to absorb passenger impact on aircraft bulkheads. Also see copending U.S. application Ser. No. 09/178, 255 which is published as PCT International publication No. WO 00/24613.

Other suitable materials which may be used include cellulosebased materials and any other materials which are capable of absorbing impact when used in a honeycomb crash pad. In addition, the present invention is applicable to a wide variety of honeycomb cell designs and shapes. Conventional hexagonal honeycomb cells are preferred. In addition, the invention is applicable to honeycombs whether they are made by the corrugation or expansion process. In general, the present invention may be used to fine tune and control the crush properties of any honeycomb which is to be used as a crash pad or crash cushion.

Figure 1:
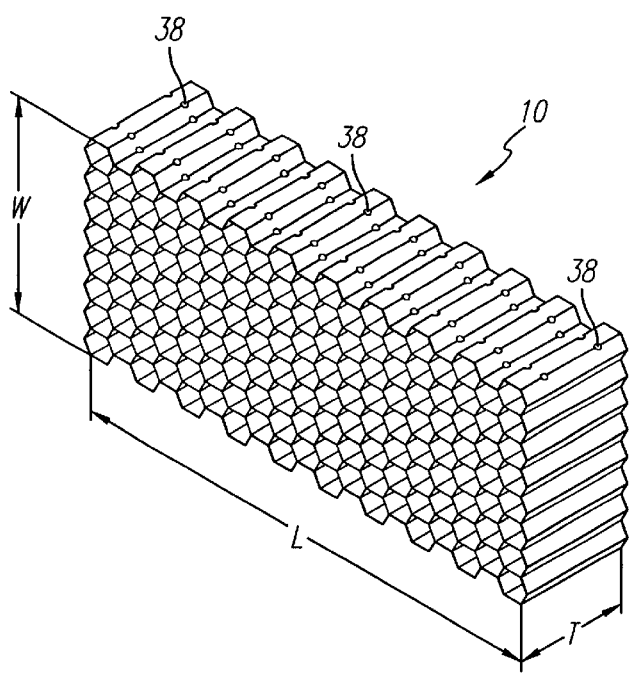
FIG. 1 is a perspective view of a honeycomb which includes compression control surfaces in accordance with the present invention.
Figure 2:
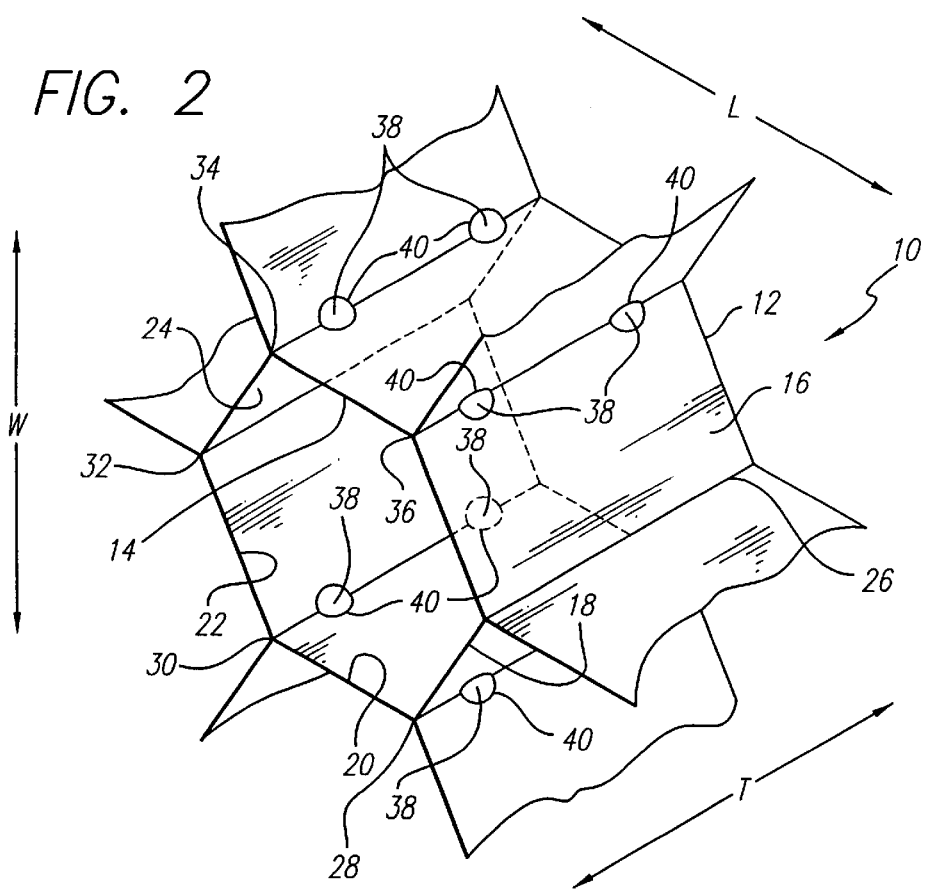
FIG. 2 is a perspective view of a honeycomb cell from the honeycomb shown in FIG. 1 which also shows portions of the surrounding honeycomb cells.
Figure 3:
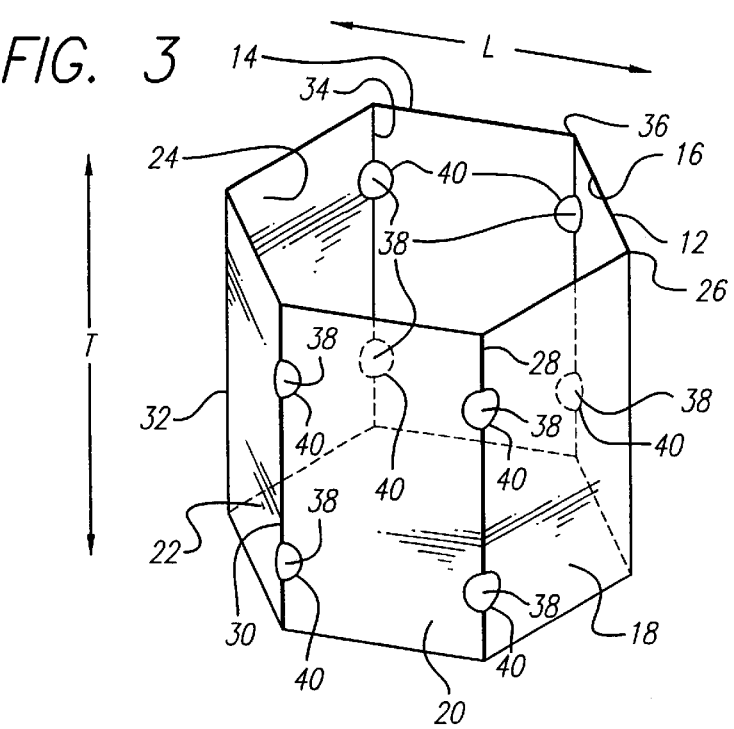
FIG. 3 is a perspective view of the honeycomb cell shown in FIG. 2.

A portion of an exemplary honeycomb in accordance with the present invention is shown generally at 10 in FIG. 1. The honeycomb 10 has a length (L), a width (W) and a thickness (T). The honeycomb 10 may be used in crash pad where the honeycomb is designed to absorb energy and be crushed in the T direction. A single honeycomb cell 12 from the honeycomb 10 is shown in FIG. 2 with the surrounding honeycomb cells only being partially shown. The cell 12 is also shown in FIG. 3 without any of the surround cell structure being shown. For simplicity, the use of compression control surfaces will be described with respect to a single honeycomb cell. It will be understood that the single cell 12 is repeated numerous times throughout the honeycomb structure.

The honeycomb cell 12 includes walls 14, 16, 18, 20, 22 and 24. The cell walls are connected together at intersections 26, 28, 30, 32, 34 and 36. The intersections extend in the thickness (T) direction of the honeycomb. In accordance with the present invention, openings 38 in the cell wall at intersections 28, 30, 34 and 36 are provided. The openings 38 are defined by the circular compression control surfaces 40 in the honeycomb. The size, shape and number of openings 38 may be varied in order to achieve desired crushing properties for the honeycomb 10. Two circular openings 38 are shown at each of four intersections 28, 30, 34 and 36. This configuration may be varied. For example, a circular opening may be provided at each intersection or any number of circular openings greater than two may be used depending upon desired reductions in crush strength. In addition, the circular opening may be changed to other shapes including elliptical, square or rectangular openings.

The way in which the honeycomb deforms may also be controlled by providing openings at only selected intersections within the honeycomb. For example, the concentration of compression control surfaces may be increased in the center of the honeycomb so that the center crushes more easily than the perimeter portions of the honeycomb. Further, deformation of a single cell can be controlled by locating compression control surfaces in 1, 2, 3, 4, 5 or 6 of the cell wall intersections. As will be appreciated, the possible variations in compression control surface size, shape, number and location within the honeycomb provides one of ordinary skill in the art with an extremely versatile procedure for accurately controlling the energy absorbing properties of a honeycomb including crush strength and deformation characteristics.

Figure 4:
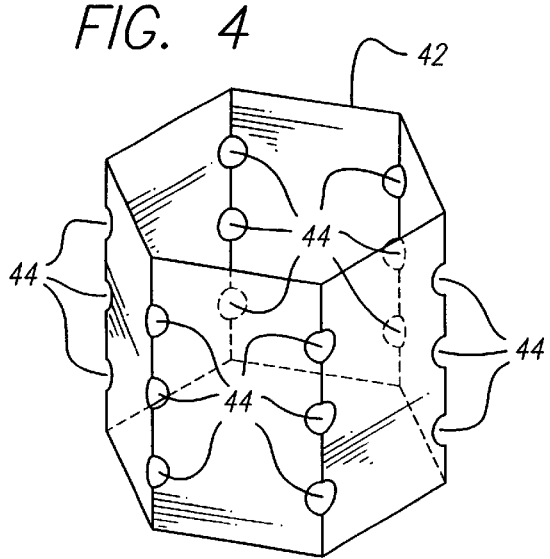
FIG. 4 is a perspective view of a second exemplary embodiment of the present invention wherein a single cell from the honeycomb is depicted for simplicity.
Figure 6:
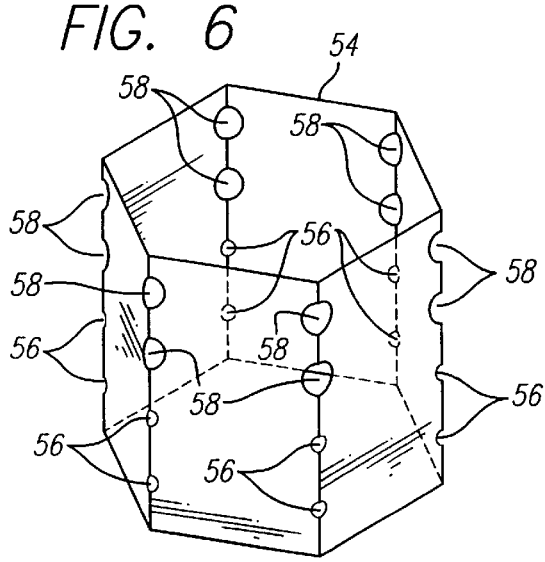
FIG. 6 depicts a fourth exemplary embodiment of the present invention wherein a single cell from the honeycomb is shown for simplicity.
Figure 7:
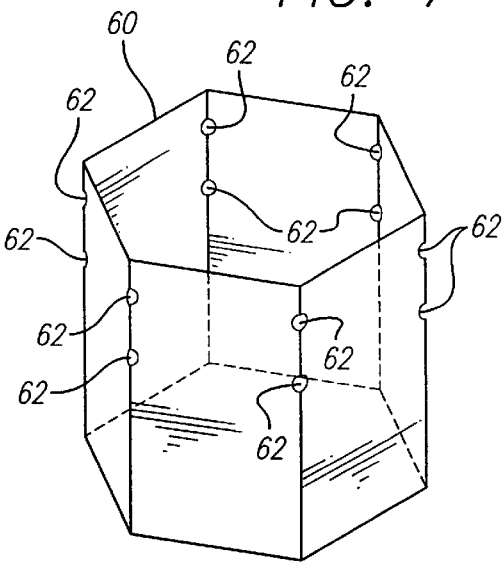
FIG. 7 depicts a fifth exemplary embodiment of the present invention wherein a single honeycomb cell is shown for simplicity.

An alternate embodiment of the present invention is depicted in FIG. 4. In this embodiment, the cell 42 includes compression control surfaces which define openings 44 at all six of the cell wall intersections. Further, three openings are provided in each cell thickness as opposed to only two as shown in FIGS. 2 and 3. Again, only a single honeycomb cell 42 is shown in FIG. 4 for simplicity. The honeycomb cells which are connected to and surround cell 42 in order to form the overall honeycomb structure are not shown. The same is true for the exemplary embodiment shown in FIGS. 5, 6 and 7.

Figure 5:
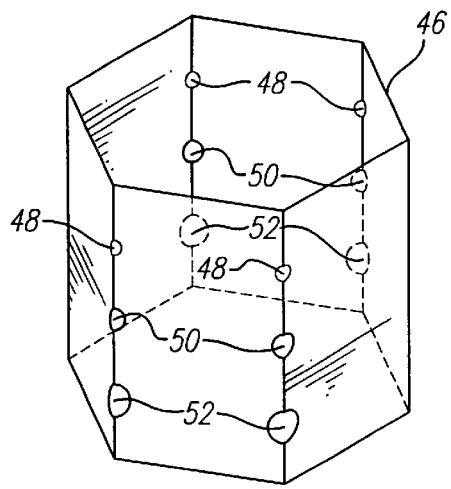
FIG. 5 depicts a third exemplary embodiment of the present invention wherein a single honeycomb cell is shown for simplicity.

In FIG. 5, a honeycomb cell 46 is shown in which the size of the openings is varied. Specifically, the honeycomb 46 includes openings 48 which are smaller than openings 50 which are in turn smaller than openings 52. By varying the opening sizes, it is possible to provide honeycomb structures which have crushing properties which vary within the honeycomb structure. A fourth exemplary embodiment of the present invention is shown by honeycomb cell 54 in FIG. 6. The honeycomb cell 54 includes openings at all honeycomb wall intersections and includes two different size openings. The smaller size openings are shown at 56 with the larger size openings being shown at 58. Another exemplary honeycomb cell is shown at 60 in FIG. 6. The honeycomb cell 60 includes openings 62 which are located towards one end of the honeycomb intersection.

The various opening configurations shown in FIGS. 1–6 are examples of only a few of the almost infinite number of configurations which may be used to modify the crush properties of a honeycomb.

Figure 8:
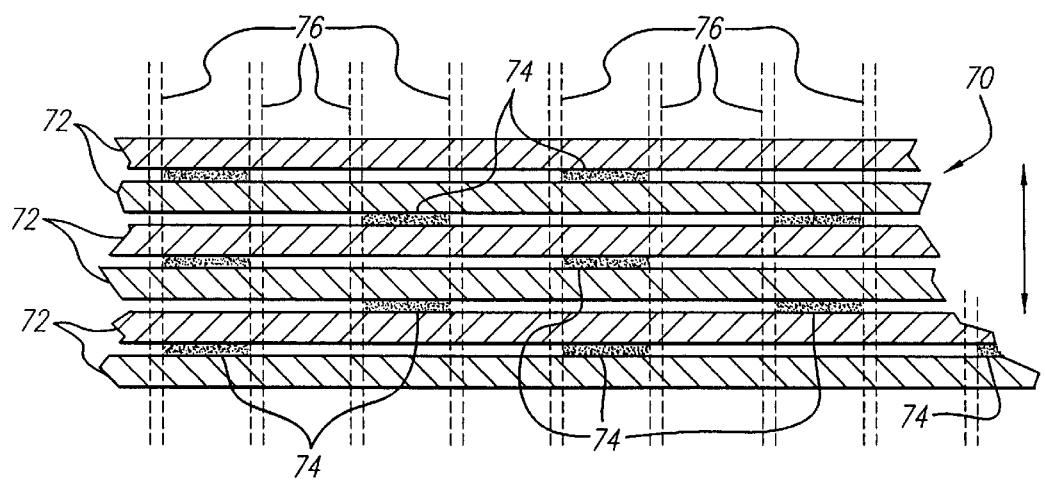
FIG. 8 is a sectional view of a honeycomb hobe which depicts an exemplary procedure for forming compression control surfaces in the honeycomb.

The openings at the cell wall intersections may be made by drilling, punching, etching or burning holes through the honeycomb. Preferably the holes are made during fabrication of the honeycomb. For example, a portion of a honeycomb hobe 70 is shown in FIG. 8 prior to being expanded to form a honeycomb. The hobe 70 includes layers 22 which are bonded together at nodes 74. Holes shown in phantom at 76 are preferably drilled through the hobe 70 to provide openings which are located at the cell wall intersections when the hobe is expanded to form the honeycomb in accordance with conventional honeycomb fabrication procedures. When honeycomb is made by the corrugation process, the individual corrugated sheets may be drilled or punched prior to bonding of the corrugated sheets together to form the honeycomb. Honeycombs utilizing hexagonally-shaped cells are preferred. However, the invention may be used to reduce and control crushing strength in any number of different honeycomb cell designs including those utilizing bisector sheets.

Having thus described exemplary embodiments of the present invention, it should be noted by those skilled in the art that the within disclosures are exemplary only and that various other alternatives, adaptations and modifications may be made within the scope of the present invention. For example, if desired, the entire honeycomb can be encapsulated with a cover plate in those situations. Accordingly, the present invention is not limited to the above preferred embodiments, but is only limited by the following claims.

What is claimed is:

1. A honeycomb having a length, a width and a thickness wherein said honeycomb is compressible in the thickness direction, said honeycomb comprising:

a plurality of cell walls which are connected together at a plurality of intersections to form a plurality of interconnected cells wherein said plurality of cell wall intersections extend in the thickness direction of said honeycomb; and compression control surfaces located in at least one of said plurality of cell wall intersections wherein each of said compression control surfaces defines an opening at said cell wall intersection to provide an increase in the compressibility of said honeycomb in said thickness direction.

2. A honeycomb according to claim 1 wherein said cell walls are connected together to form cells having a hexagonal shape.

3. A honeycomb according to claim 1 wherein at least one compression control surface is located in each of said intersections.

4. A honeycomb according to claim 1 wherein the openings defined by said compression control surfaces do not all have the same cross-sectional area.

5. A honeycomb according to claim 1 wherein said compression control surfaces are located uniformly throughout said honeycomb.

6. A honeycomb according to claim 1 wherein said compression control surfaces are not uniformly located throughout said honeycomb.

7. In a honeycomb having a length, a width, a thickness and a resistance to crushing in said thickness direction, said honeycomb including a plurality of cell walls which are connected together at a plurality of intersections which extend in said thickness direction, the improvement comprising controlling the resistance to crushing of said honeycomb compression control surfaces located in at least one of said plurality of intersection wherein each of said compression control surfaces defines an opening through said cell wall intersection and wherein sufficient openings are provided to reduce the resistance of said honeycomb to crushing.

8. An improved honeycomb according to claim 7 having reduced crushing strength wherein said cell walls are connected together to form cells having a hexagonal shape.

9. An improved honeycomb according to claim 7 having reduced crushing strength wherein at least one compression control surface is located in each of said intersections.

10. An improved honeycomb according to claim 7 having reduced crushing strength wherein the openings defined by said compression control surfaces do not all have the same cross-sectional area.

11. An improved honeycomb according to claim 7 having reduced crushing strength wherein said compression control surfaces are located uniformly throughout said honeycomb.

12. An improved honeycomb according to claim 7 having reduced crushing strength wherein said compression control surfaces are not uniformly located throughout said honeycomb.

13. A method for reducing the resistance to crushing of a honeycomb wherein said honeycomb has a length, a width, a thickness and a resistance to crushing in said thickness direction, said honeycomb including a plurality of cell walls which are connected together at a plurality of intersections which extend in said thickness direction, said method comprising the step of providing compression control surfaces located in at least one of said plurality of intersection wherein each of said compression control surfaces defines an opening through said cell wall intersection and wherein sufficient openings are provided to reduce the resistance of said honeycomb to crushing.

14. A method for reducing the crushing strength of a honeycomb according to claim 13 wherein said cell walls are connected together to form cells having a hexagonal shape.

15. A method for reducing the crushing strength of a honeycomb according to claim 13 wherein at least one compression control surface is located in each of said intersections.

16. A method for reducing the crushing strength of a honeycomb according to claim 13 wherein the openings defined by said compression control surfaces do not all have the same cross-sectional area.

17. A method for reducing the crushing strength of a honeycomb according to claim 13 wherein said compression control surfaces are located uniformly throughout said honeycomb.

18. A method for reducing the crushing strength of a honeycomb according to claim 13 wherein said compression control surfaces are not uniformly located throughout said honeycomb.

* * * * *